Patented June 19, 1928.

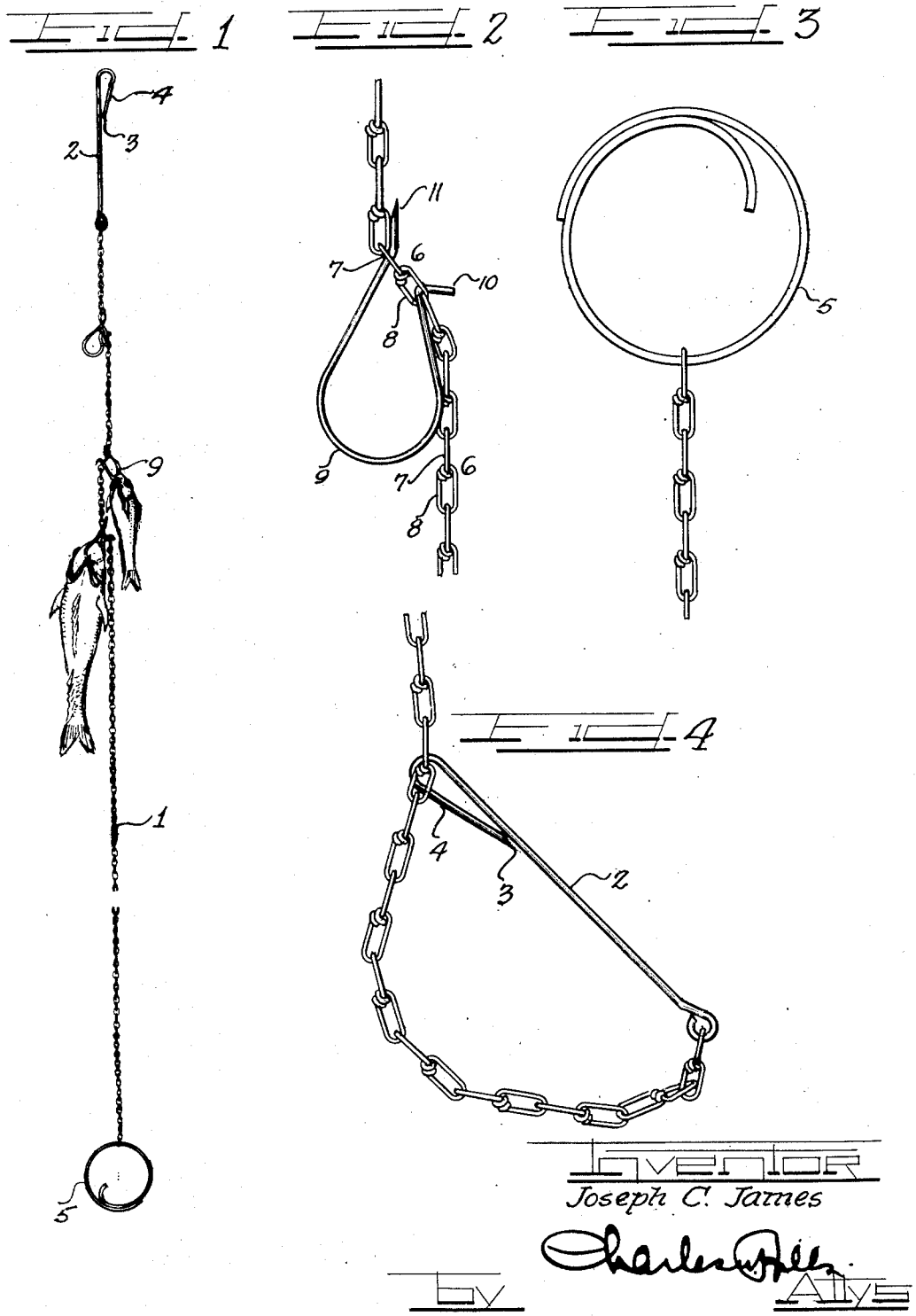

1,674,045

UNITED STATES PATENT OFFICE.

JOSEPH C. JAMES, OF ANTIOCH, ILLINOIS.

FISH STRINGER.

Application filed January 22, 1926. Serial No. 82,929.

This invention relates to improvements in fish stringers of the type on which fish are adapted to be strung and left in the water, the stringer usually having a toggle on the end thereof to prevent the fish from coming off, and adapted to be fastened to a boat or a wharf. In the stringers heretofore used the toggle is usually permanently secured on the tail of the stringer, making it necessary to remove the fish from the head thereof. If the head was provided with an elongated member to facilitate threading the fish on the stringer, or if the head was provided with a hook or the like to facilitate tying the stringer to a wharf or a boat this made is considerably difficult to remove the fish from the head of the stringer. In addition the stringers now in use are adapted to be threaded through the gills and mouth of the fish and are not provided with any means for spacing the fish along the length of the stringer, but the fish are allowed to bunch up thereon, usually against the toggle on the tail end thereof. When the stringer is threaded through the gills of the fish, their breathing is cut off and they do not live very long.

It is accordingly an object of this invention to provide a fish stringer having means on the head end thereof by which it may be readily attached to or detached from a boat or wharf and left in the water, and having also a detachable toggle on the tail end thereof so that the fish need not be removed from the head end over said first means but may be removed from the tail end.

It is a further important object of this invention to provide a stringer having a combined means on the head end thereof for both detachably fastening the stringer as above and to facilitate the placing of fish thereon.

It is further an object of this invention to provide a fish stringer having means along the length thereof for supporting individual fish separately at a distance apart whereby they may swim naturally and thereby attract other fish and wherein they are supported in a manner which will permit said fish to remain alive.

Other and further important objects of this invention will be apparent from the disclosures in the specification and the accompanying drawings.

This invention (in a preferred form) is illustrated in the drawings and hereinafter more fully described.

On the drawings:

Figure 1 is a plan view of a fish stringer embodying this invention.

Figure 2 is an enlarged fragmentary detail view showing an individual clip attached to the stringer chain.

Figure 3 is an enlarged fragmentary detail view showing the detachable tail member on the stringer chain.

Figure 4 is an enlarged fragmentary detail view showing the combined threader and fastening member on the head of the chain.

As shown on the drawings:

Referring to Figure 1 there is shown a chain 1 constructed of a comparatively small wire and having a threader or needle 2 loosely secured to one end thereof. The free end of the needle 2 is bent backward along the length thereof to form an elongated bight or hook 4. As shown in Figure 4, the end 3 is bevelled in a manner which is adapted to permit the bight 4 to be easily hooked to the standing part of the chain so as to fasten the latter to a boat or stake for permitting the chain to hang or drag in the water. The bight 4 being narrow and elongated, the needle 2 is also adapted for threading the chain through the gills of a fish. A detachable toggle clip 5 is provided on the tail end of the chain 1 so as to prevent the fish after being threaded on said chain from escaping therefrom and to permit said fish to be readily removed by turning said clip off the chain and dropping the fish off said end. The individual links of the chain 1 each consists of a double link 6 or a pair of bights 7 and 8 formed from a single section of wire, the plane of one bight being normal to the plane of the other bight.

In order that the fish may be supported individually, any desired distance apart on the stringer and in a manner which will permit the fish to remain alive, means are provided comprising detachable clips 9 which are substantially U-shaped, the ends thereof acting to spring outwardly. One of the ends 10 of the clip 9 is considerably shorter than the other end and is bent laterally to form an outwardly extending hook adapted to be secured in the lower bight 8 of one of the links 6 of the chain. The other end 11 of each of the clips 9 is bent slightly outwardly, also acts as a hook, and is adapted to extend into the upper bight 7 of one of the links 6. The end 11 is sharpened so as to facilitate the threading of the clip through the nose of a fish. By thus threading the clip through the nose of the fish and not through its gills, the breathing of the fish is not interfered with and it is enabled to live. When the weight of a fish or the like is supported on one of the clips 9, the same will hang as shown in Figure 2 so that when it is being dragged through the water, the end 11 will be substantially parallel with the movement of the chain and will not be apt to pick up weeds and the like.

It will be obvious that by the foregoing construction I have provided a fish stringer which may be efficiently used.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A fish stringer comprising a chain and a series of detachable clips adapted to be secured thereto, said clips each being substantially U-shaped, the ends thereof being adapted to spring outwardly, an integral hook on one of said ends provided by bending one end at substantially a right angle to the body part and the other of said ends being bent to a less extent in an outward direction forming a second hook.

2. A fish stringer comprising a chain having a plurality of links, and having loosely connected to one end thereof a threading needle, said needle having an elongated body part with a closed eye at one end to receive a terminal link of the chain and an elongated bight at the other end formed by bending said end of the needle back upon the body part until said end is in substantial contact with said body part, and the terminal end of the bight having an out turned part to conveniently engage and enter a link of the aforesaid chain.

3. A fish stringer including a chain having a plurality of links and a plurality of detachable clips, each clip comprising a piece of wire having a sharpened end and a relatively blunt end, said blunt end bent at substantial right angles to the body part of the clip and said sharpened end bent to lie close up to the chain body when said sharpened end has been passed thru a link and said blunt end has been passed thru an adjacent link substantially as and for the purpose described.

4. In a fish stringer, the combination of a chain having a plurality of links, an elongated member loosely connected at one end thereof and having an elongated bight adapted to engage and enter a link of said chain, and a plurality of detachable clips adapted to engage adjacent links of said chain.

5. In a fish stringer, the combination of a chain having a plurality of links, a threading needle loosely attached to one end thereof and provided with an elongated bight adapted to engage and enter a link of said chain, and a removable toggle on the other end of said chain.

6. In a fish stringer, a chain, and detachable clips adapted to engage adjacent links of said chain, said clips being independently removable without breaking the continuity of said chain.

7. In a fish stringer, a chain having a plurality of links, and a threading needle loosely attached to a link of said chain, said needle having a portion thereon rearwardly bent to form substantially a closed loop and to engage and enter a link of said chain.

In testimony whereof I have hereunto subscribed my name.

JOSEPH C. JAMES.